Patented Aug. 16, 1949

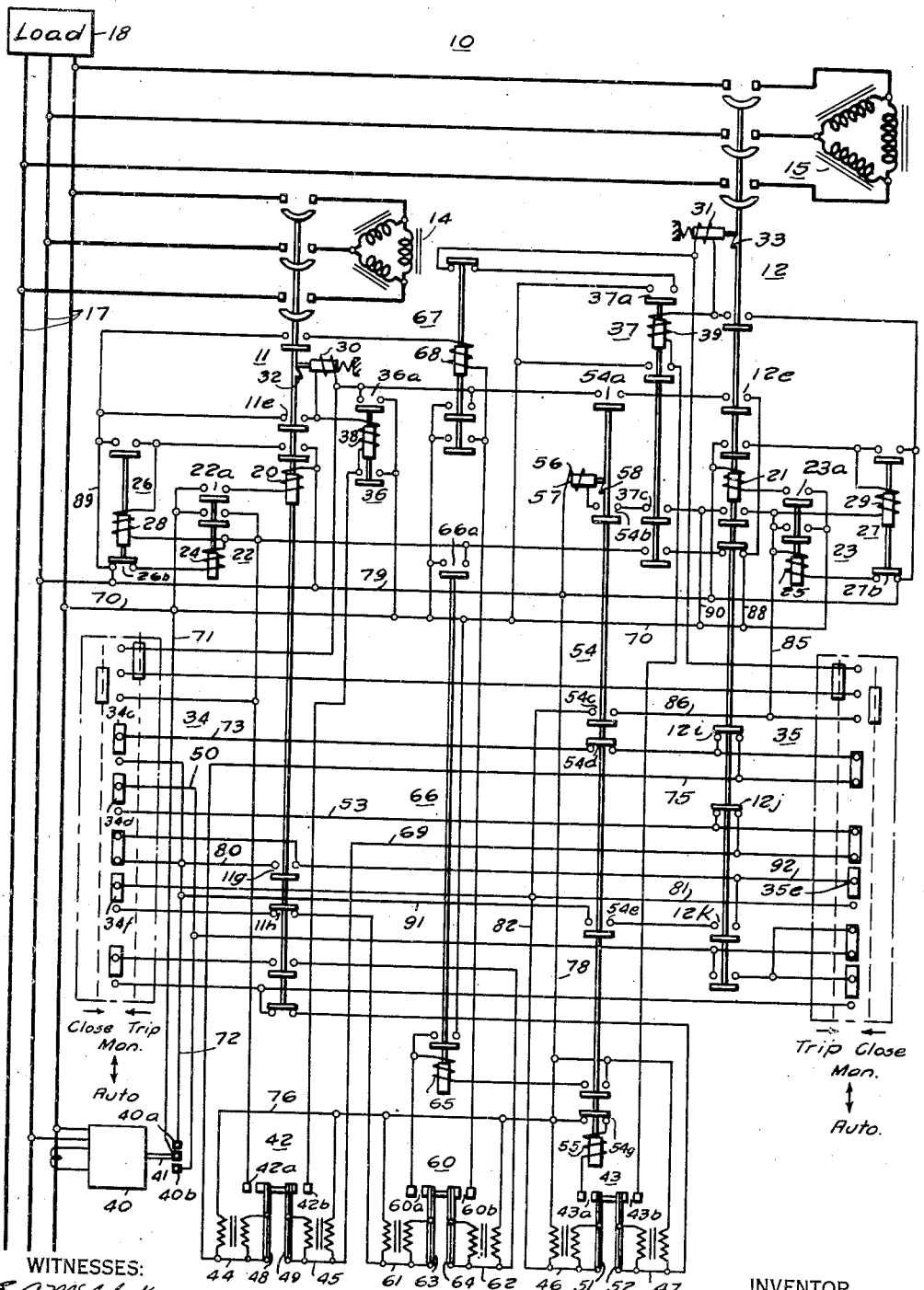

2,479,289

UNITED STATES PATENT OFFICE 2,479,289

AUTOMATIC CONTROL SYSTEM FOR REACTORS

Edward T. Arters, Pittsburgh, Pa., assignor to Westinghouse Electric Corporation, East Pittsburgh, Pa., a corporation of Pennsylvania Application June 9, 1945, Serial No. 598,473

6 Claims. (Cl. 323—127)

My invention relates, generally, to control systems and has reference, in particular, to automatic switching systems for controlling the reactive energy in power systems.

Generally stated, it is an object of my invention to provide a control system that is simple and inexpensive to manufacture and is easy to operate.

A more specific object of my invention is to provide for controlling the reactive energy of an electric circuit by selectively connecting to the circuit two reactors, one of which has twice the reactance of the other, so as to provide three equal steps of reactance.

It is also an object of my invention to provide for obtaining the greatest number of equal steps of reactance with the least amount of equipment.

Another object of my invention is to provide for using a single, sensitive, control relay, responsive to the reactive energy of a power circuit, for controlling the connection of a plurality of reactors to the circuit.

Yet another object of my invention is to provide for using a sequence relay for selectively effecting the connection of a pair of reactors to a power circuit under the control of a single control relay responsive to the reactive energy of the circuit.

Other objects will in part be obvious, and will in part be explained hereinafter.

In accordance with one embodiment of my invention, two shunt reactors, one having double the reactance of the other, are used to provide three equal steps of reactance for compensating for the effects of the charging current of a transmission line. A single control relay responsive to the reactive energy of the line controls the connections of both reactors to the line. A sequence relay normally provides for effecting connection of the smaller reactor to the line under the control of the control relay to provide the first step of reactance. Upon the connection of the smaller reactor, the sequence relay operates to provide for connecting the larger reactor to the line under the control of the same control relay to provide the second step of reactance. When the larger reactor is connected, the smaller one is disconnected, and is thereupon again placed under the control of the same control relay for reconnection to the line to provide the third step of reactance.

For a more complete understanding of the nature and scope of my invention, reference may be made to the following detailed description, which may be studied in connection with the accompanying drawing in which the single figure is a diagrammatic view of an automatic switching system embodying the invention in one of its forms.

Referring to the single figure of the drawing, the reference numeral 10 may denote, generally, an automatic switching system comprising circuit breakers 11 and 12 for controlling the connection of reactance devices such as the banks of shunt reactors 14 and 15, respectively, to the conductors 17 of an electric circuit or a transmission line which connects a load 18 to a suitable power source, for the purpose of neutralizing the effect of the charging current of the line. In order to provide three equal steps of reactance, the reactors 15 preferably have twice the reactance of the reactors 14.

The circuit breakers 11 and 12 may be of any suitable type being, for example, provided with operating windings 20 and 21 disposed to be energized by closing switches 22 and 23, having operating windings 24 and 25, respectively. Cut-off relays 26 and 27, having operating windings 28 and 29, respectively, may be provided for effecting deenergization of the operating windings of the closing relays when their respective circuit breakers close. Each of the circuit breakers may be provided with trip means comprising, for example, trip windings 30 and 31 for effecting disengagement of latch members 32 and 33, respectively. The circuit breakers may be provided with control switches 34 and 35, respectively, for connecting them for either manual or automatic control. The control switches 34 and 35 may be of any suitable type comprising, for example, switches of the drum type, which may be manually rotatable for effecting energization of either the closing switches or the trip windings, and operable to a third position by moving the handle axially to connect the circuit breakers for automatic control.

In order to provide for controlling the circuit breakers 11 and 12 automatically, auxiliary trip relays 36 and 37 may be provided having operating windings 38 and 39, respectively. These auxiliary trip relays function to provide for energizing the trip windings 30 and 31 when the control switches 34 and 35 are in the automatic position.

In order to provide for selectively connecting the banks of reactors 14 and 15 to the conductors 17 in accordance with a condition effected by the reactive energy of the circuit, only a single sensitive control relay 40 responsive to the reactive energy of the circuit is utilized. The relay 40 may be provided with a movable armature 41 for selectively engaging contact members 40a and 40b, depending on whether the reactive energy of the circuit is leading or lagging and exceeds predetermined values thereof.

In order to prevent "pumping" of the control system due to momentary fluctuations in the reactive energy of the circuit, time delay means 42 and 43 may be provided for effecting operation of the circuit breakers 11 and 12 under the control of the control relay 40 only after the reactive energy has remained above or below the predetermined value for a predetermined time.

The time delay means may be of any suitable type comprising, for example, control transformers 44, 45 and 46, 47, having primary windings disposed to be energized under the control of the control relay and having bimetallic contact elements connected to the secondary windings for completing operating circuits for the closing relays and trip means of the circuit breakers. The bimetallic elements 48 and 49 of the time delay means 42 may be mechanically connected in opposed relation so as to neutralize the effects of variations in ambient temperature. The bimetallic elements 51 and 52 of the time delay means 43 may be similarly connected.

In order to provide for effecting selective connection and disconnection of the banks of reactors 14 and 15 to and from the circuit, a sequence relay 54 may be utilized. This sequence relay may be disposed to normally connect the time delay means 42 for effecting connection of the bank of reactors 14 to the circuit under the control of the relay 40. An operating winding 55 may be provided for operating the relay whenever the time delay means 43 operates to effect connection of the bank of reactors 15 to the circuit while the circuit breaker 11 is closed. Reset means comprising a reset winding 56 may be provided for retracting an armature 57 from engagement with a latch member 58 to return the sequence relay 54 to its normal position whenever the time delay means 43 operates to open the circuit breaker 12.

In order to provide three equal steps of reactance provision may be made for tripping the circuit breaker 11 whenever the circuit breaker 12 is closed in response to a continued demand for more inductive reactance after the reactors 14 are connected to the circuit. An additional time delay means 60 may be provided for controlling the connection of the reactors 14 to the circuit after the circuit breaker 12 connects the reactors 15 thereto. The time delay means 60 may be of any suitable type comprising, for example, transformers 61 and 62 having primary windings disposed to be selectively energized under the control of the control relay 40 and having bimetallic elements 63 and 64 connected to the secondary winding thereof for effecting energization of the operating winding 65 of an auxiliary closing relay 66 which energizes the closing relay 22, and an auxiliary tripping relay 67 provided with an operating winding 68 for energizing the trip winding 30.

When the system is in the deenergized position, as shown, the control relay 40 will close its contact members 40a and 40b depending on whether the reactive energy of the circuit is leading or lagging, and in excess of a predetermined amount. With the control switches 34 and 35 operated to the automatic position, an energizing circuit is provided for the primary winding of the transformer 44 of the time delay means 42, extending from the right-hand conductor 17 through conductors 70 and 71, armature 41, contact member 40a, conductor 72, contact member 34c, conductor 73, back contact member 54d of the sequence relay 54, back contact member 12i of the circuit breaker 12, conductor 75, primary winding of the transformer 44, conductors 76, 78 and 79, back to the intermediate conductor 17. After a predetermined time the bimetallic element 48 deflects and engages contact member 42a to provide an energizing circuit for the operating winding 24 of the closing switch 22 through back contact member 26b of the cut-off relay 26 to the intermediate conductor 17. The closing switch 22 is thus operated and provides an energizing circuit for the operating winding 20 of the circuit breaker 11 through contact members 22a. Circuit breaker 11 operates and connects the bank of reactors 14 to the conductors 17 for the first step of reactance.

When the inductive reactance of the circuit increases above the predetermined value for which the control relay 40 closed its contact members 40a, contact members 40a open, and the system operates with the reactors 14 connected to the conductors 17. Should the load conditions change so that the inductive reactance of the circuit increases still further to the predetermined value for which contact members 40b close, an energizing circuit is provided for the primary winding of the transformer 45 of the time delay means 42 from armature 41 through contact member 40b, conductor 50, contact member 34d, conductor 53, contact members 12j, conductor 69, primary winding of transformer 45, conductors 76, 78 and 79, to the intermediate conductor 17. After a predetermined time the bimetallic element 49 engages contact member 42b and provides an energizing circuit for the operating winding 38 of the auxiliary trip relay 36. The relay 36 operates and provides an energizing circuit for the trip winding 30 of circuit breaker 11 through contact members 36a so that the latch member 32 is disengaged, opening this circuit breaker and disconnecting the reactors 14 from the conductors 17.

If, with the circuit breaker 11 closed and the bank of reactors 14 connected to the conductors 17, the inductive reactance of the circuit either remains at or decreases to a value for which the control relay 40 closes its contact members 40a, an energizing circuit is now provided for the primary winding of the transformer 46 of the time delay means 43. This circuit may be traced from the right-hand conductor 17 through conductors 70 and 71, armature 41, contact member 40a, conductors 72 and 80, back contact members 11g of the circuit breaker 11, contact member 35e of the control switch 35, conductors 81 and 82, through primary winding of the transformer 46, conductors 78 and 79 to the intermediate conductor 17. The bimetallic element 51 operates after a predetermined time engaging contact member 43a. An obvious energizing circuit is thereby established for the operating winding 55 of the sequence relay 54 through contact members 54g, which thereupon operates to the latched position.

Operation of the sequence relay 54 provides an energizing circuit for the operating winding 25 of the closing switch 23 for the circuit breaker 12 extending from the intermediate conductor 17 through conductor 79, back contact members 27b of the cut-off relay 27, operating winding 25, conductors 85 and 86, front contact member 54c of the sequence relay 54, conductors 81 and 82, contact member 35e, conductor 92, contact members 11g, conductor 72, contact member 40a, armature 41 and thence back to the right-hand conductor 17. The closing switch 23 operates and provides an energizing circuit for the operating winding 21 of the circuit breaker 12 through contact members 23a.

The circuit breaker 12 thereupon closes, connecting the bank of reactors 15 to the conductors 17. Closure of the circuit breaker 12 provides an energizing circuit for the trip winding 30 of the circuit breaker 11 extending from the right-hand conductor 17 through conductors 70 and 88, front contact members 12e of the circuit breaker 12, front contact members 54a of the sequence relay 54, operating winding 30, front contact members 11e of the circuit breaker 11, conductors 89 and 79 to the intermediate conductor 17. Circuit breaker 11 thereupon opens, disconnecting the bank of reactors 14 from the conductors 17 to complete the operation for connecting the second step of reactance to the circuit.

With the reactors 15 connected to the conductors 17, if the reactive energy of the circuit changes to the predetermined lagging value for which the control relay 40 operates to connect the armature 41 to contact member 40b, an energizing circuit is provided for the primary winding of the transformer 47 of the time delay means 43. After a predetermined time, the bimetallic element 52 engages contact member 43b to provide an energizing circuit for the operating winding 39 of the auxiliary trip relay 37. The trip winding 31 is thereby energized through contact members 37a to effect disengagement of the latch member 33, thus opening the circuit breaker 12 and disconnecting the reactors 15 from the conductors 17.

Should the disconnection of the reactors 15 result in the operation of the control relay 40 to connect armature 41 and contact member 40a, the reactors 14 may be reconnected to the conductors 17 in the manner as described hereinbefore, since the sequence relay 54 is returned to the original or normal position upon operation of the auxiliary trip relay 37 by energization of the reset winding 56. This energizing circuit extends from the intermediate conductor 17 through conductor 79, operating winding 56, front contact member 54b, front contact member 37c of the auxiliary trip relay 37, conductors 90 and 70 to the right-hand conductor 17.

With the reactors 15 connected to the conductors 17, if the reactive energy of the circuit reaches the predetermined leading value for which the control relay 40 is set, the relay will again operate so that armature 41 engages contact member 40a. Since the circuit breaker 11 is open, the sequence relay 54 is in its operated position and the circuit breaker 12 is closed, an energizing circuit is therefore provided for the primary winding of the transformer 61 of the time delay means 60.

This circuit extends from the right-hand conductor 17 through conductors 70 and 71, armature 41, contact member 40a, conductors 72 and 91, front contact members 54e, front contact members 12k, conductor 92, contact member 35e, conductor 81, contact member 34f, back contact members 11h, primary winding of transformer 61, conductors 76, 78 and 79 to the intermediate conductor 17. After a predetermined time the bimetallic element 64 operates to engage contact member 69a, thereby providing an energizing circuit for the operating winding 65 of auxiliary control relay 66.

The auxiliary control relay connects the operating winding 24 of the closing switch 22 of the circuit breaker 11 to the source through contact members 66a to provide for operation of the circuit breaker 11 to connect the reactors 14 to the conductors 17, thus providing a third equal step of reactance.

Should the reactive energy of the circuit subsequently increase sufficiently, to reach the lagging value for which the armature 41 engages contact members 40b, the additional time delay means 60 operates under the control of the control relay 40 to close contact members 60b and effect energization of the operating winding 68 of the auxiliary trip relay 67. The trip winding 30 is thereby energized to open the circuit breaker 11.

Upon a further increase in the reactive energy, the control relay 40 again operates so that armature 41 engages contact member 40b, whereby the primary winding of the transformer 47 of the time delay means 43 is energized for effecting operation of the auxiliary trip relay 37 to effect operation of the circuit breaker 12 to disconnect the reactors 15. Since the reset winding 56 of the sequence relay 54 is energized through contact members 37c of the auxiliary trip relay 37, the sequence relay 54 is thereby restored to its normal operating position and the operation of the circuit breaker 11 is thereupon returned to the control of the reactive energy control relay 40.

From the above description and the accompanying drawing it will be apparent that I have provided, in a simple and effective manner, for selectively controlling the connection of a plurality of reactors to a load circuit under the control of a single selective control means. By using two reactors, one of which has twice the reactance of the other, and switching the reactors in a predetermined sequence, three equal steps of reactance may be provided in increasing or decreasing amounts. By using a sequence relay responsive to the operating condition of the circuit breakers for controlling the connections of the reactive energy control relay, a simple and effective control system is provided utilizing a minimum of equipment. The maintenance and operation of the control system are thus greatly simplified.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. For use with an alternating-current power system, a first reactance device, a second reactance device having more reactance than the first device, first and second switch means for connecting the first and second reactance devices to the power system respectively, circuit means for opening the first switch means when the second switch means closes, control means responsive to an electrical condition of the power system which is affected by the reactive kilovoltamperes of the system for effecting closing of the first switch means, and sequencing means responsive to closure of the first switch means before the first switch means open to connect the second switch means for closure under the control of the control means and responsive to closing of the second switch means to reconnect the first switch means for closing under the control of the control means.

2. For use with a power system, a pair of reactance devices one being of double the value of the other, switch means individual to each of the reactance devices for connecting and disconnecting the devices to and from the power system, control means responsive to the reactive energy of the system for operating the switch means to connect the reactance devices to and disconnect them from the power system, sequence means normally connecting the switch means of the smaller of the reactance devices for operation under the control of the control means responsive to closure of said switch means to connect the other switch means for operation under control of the control means before the switch means of the smaller of the reactance devices opens, and circuit means responsive to closure of the other switch means for effecting operation of the sequence means to return the switch means of the smaller of the reactances to the control of the control means.

3. A control system comprising, a first reactance device, a second reactance device having twice the amount of reactance as the first device, a first switch means for controlling the connection of the first reactance device to a power system, a second switch means for controlling the connection of the second reactance device to the power system, control means responsive to an electrical condition of the system affected by the reactive energy of the system for selectively effecting the opening and closing of the switch means, sequence means normally connecting the first switch means for operation under the control of the control means and operable to connect the second switch means for operation under the control means as soon as the first switch means closes, circuit means after the second switch means closes responsive to closure of the second switch means for opening the first switch means, and means responsive to closure of the second switch means for connecting the control means to effect operation thereof to the normal position whereby the first switch means is reconnected for operation under control of the control means.

4. A control system comprising, a first reactor, a second reactor having twice the reactance of the first, first and second switch means operable to connect the reactors to a power system, a control relay responsive to the reactive energy of the system, a sequence relay normally connecting the first switch means for operation under control of the control relay and operable upon closing of said first switch means to connect the second switch means for operation, means responsive to operation of the second switch means for opening the first switch means after the second switch means closes, and circuit means controlled by the sequence relay and the second switch means for connecting the first switch means for operation under the control of the control relay.

5. A control system comprising, a first reactor, a second reactor having twice the reactance of the first reactor, first and second switch means for respectively connecting the reactors to an electric circuit, control means responsive to the reactive energy of the means for operating the first and second switch means, circuit means normally connecting the first time delay means for operation at a predetermined time after a predetermined energy condition occurs in the circuit, circuit means responsive to closing of the first switch means to connect the sequence relay for operation to connect the second time delay means for operation under the control of the control means, circuit means responsive to closing of the second switch means for opening the first switch means after the second switch means closes, an additional time delay means for effecting operation of the first switch means, circuit means responsive to opening of the first switch means and closing of the second switch means for connecting the additional time delay relay for operation under the control of the control means.

6. In a control system, a first reactor, a second reactor having twice the reactance of the first reactor, first and second switch means for respectively connecting the first and second reactors to an electric circuit, control means responsive to predetermined reactive energy conditions of the circuit, first and second time delay means operable to effect operation of the first and second switch means respectively, sequence means normally operable to connect the first time delay means for energization by the control means and operable to connect the second time delay means in place of the first time delay means when the second switch means operates, means for deenergizing the first switch means after the second switch means closes, and means including additional time delay means controlled by the control means for reclosing the first switch means.

EDWARD T. ARTERS.

REFERENCES CITED

The following references are of record in the file of this patent:

UNITED STATES PATENTS

| Number | Name | Date |
|---|---|---|
| 1,640,539 | Evans | Aug. 30, 1927 |
| 2,146,556 | Bany | Feb. 7, 1939 |
| 2,243,575 | Ono | May 27, 1941 |
| 2,293,484 | Anderson | Aug. 18, 1942 |
| 2,295,388 | Cuttino | Sept. 8, 1942 |
| 2,451,939 | Geiselman et al. | Oct. 19, 1948 |